(12) United States Patent
Falls et al.

(10) Patent No.: US 11,465,445 B2
(45) Date of Patent: Oct. 11, 2022

(54) VEHICLE AXLE ASSEMBLY

(71) Applicant: AVL Powertrain Engineering, Inc., Plymouth, MI (US)

(72) Inventors: Bruce Falls, Dove Canyon, CA (US); Adrian Quintana, Foothill Ranch, CA (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 64 days.

(21) Appl. No.: 16/892,410

(22) Filed: Jun. 4, 2020

(65) Prior Publication Data

US 2020/0384806 A1  Dec. 10, 2020

Related U.S. Application Data

(60) Provisional application No. 62/857,692, filed on Jun. 5, 2019.

(51) Int. Cl.
*B60B 35/12* (2006.01)
*B60K 17/04* (2006.01)
(Continued)

(52) U.S. Cl.
CPC .............. *B60B 35/125* (2013.01); *B60K 1/00* (2013.01); *B60K 17/046* (2013.01); *B60K 17/10* (2013.01);
(Continued)

(58) Field of Classification Search
CPC .... B60B 35/125; B60K 17/046; B60K 17/10; B60K 17/16; B60K 1/00; B60K 2001/001; B62D 21/11
See application file for complete search history.

(56) References Cited

U.S. PATENT DOCUMENTS 4,522,898 A  6/1985 Esrom
8,570,047 B1  10/2013 Davies et al.
(Continued)

FOREIGN PATENT DOCUMENTS

AU  2010298629 B2  11/2014
CN  204011518 U  12/2014
(Continued)

OTHER PUBLICATIONS

European Patent Office (ISA), International Search Report and Written Opinion for PCT Application No. PCT/US2020/036029, dated Oct. 15, 2020.
(Continued)

*Primary Examiner* — Erez Gurari
(74) *Attorney, Agent, or Firm* — Honigman LLP; Matthew H. Szalach

(57) ABSTRACT

An axle assembly for a vehicle includes a frame, a motor, and a pair of gear reduction subassemblies. The frame extends between a first distal end and a second distal end. The second distal end opposes the first distal end. The motor is secured to the frame between the first distal end and the second distal end. The pair of gear reduction subassemblies are rotatably coupled to the first distal end and the second distal end and configured to drive rotation from the motor to a pair of wheels. Each gear reduction subassembly includes a plurality of gears defining a plurality of gear ratios.

12 Claims, 6 Drawing Sheets

(51) Int. Cl.
  *B60K 17/10* (2006.01)
  *B60K 1/00* (2006.01)
  *B60K 17/16* (2006.01)
  *B62D 21/11* (2006.01)

(52) U.S. Cl.
  CPC ........ *B60K 17/16* (2013.01); *B60K 2001/001* (2013.01); *B62D 21/11* (2013.01)

(56) References Cited

U.S. PATENT DOCUMENTS

| | | | | |
|---|---|---|---|---|
| 2003/0203782 | A1* | 10/2003 | Casey | F16H 37/0813 |
| | | | | 475/150 |
| 2004/0200648 | A1* | 10/2004 | Tarasinski | B60L 15/2009 |
| | | | | 180/65.7 |
| 2013/0333959 | A1* | 12/2013 | Wagemann | B60K 7/0015 |
| | | | | 180/62 |
| 2014/0245862 | A1 | 9/2014 | Lang et al. | |
| 2014/0330471 | A1* | 11/2014 | Ozaki | H02P 29/02 |
| | | | | 701/22 |
| 2016/0178041 | A1 | 6/2016 | Hagman | |
| 2016/0377162 | A1 | 12/2016 | Ziskovsky et al. | |
| 2018/0345778 | A1 | 12/2018 | Yamanaka | |
| 2019/0118649 | A1* | 4/2019 | Han | B60K 17/08 |
| 2019/0120356 | A1* | 4/2019 | Han | B60K 17/046 |
| 2019/0120357 | A1* | 4/2019 | Han | F16H 37/082 |
| 2020/0062114 | A1* | 2/2020 | Holmes | F16H 48/05 |
| 2020/0070638 | A1* | 3/2020 | Flaxman | B62D 11/16 |
| 2020/0384806 | A1* | 12/2020 | Falls | B60K 17/046 |
| 2021/0102607 | A1* | 4/2021 | Ghatti | F16H 3/089 |
| 2021/0138885 | A1* | 5/2021 | Engerman | B60K 17/16 |
| 2021/0178813 | A1* | 6/2021 | Stoecker | H02K 7/003 |
| 2021/0245599 | A1* | 8/2021 | Mepham | B60B 35/125 |

FOREIGN PATENT DOCUMENTS

| | | |
|---|---|---|
| CN | 204167947 U | 2/2015 |
| CN | 108215786 A | 6/2018 |
| EP | 2320537 A2 | 5/2011 |
| WO | WO-2008076040 A1 | 6/2008 |
| WO | WO-2008095313 A1 | 8/2008 |
| WO | WO-2008111962 A1 | 9/2008 |
| WO | WO-2011061571 A1 | 5/2011 |
| WO | WO-2017114422 A1 | 7/2017 |

OTHER PUBLICATIONS

International Search Report and Written Opinion for Application No. PCT/US2020/036036 dated Oct. 2, 2020.

European Patent Office (ISA), International Search Report and Written Opinion for PCT App. No. PCT/US2020/036236, dated Nov. 2, 2020.

European Patent Office (ISA), International Search Report and Written Opinion for PCT Application No. PCT/US2020/050080, dated Nov. 16, 2020.

\* cited by examiner

VEHICLE AXLE ASSEMBLY

CROSS REFERENCE TO RELATED APPLICATION

This application claims priority under 35 U.S.C. § 119(e) to U.S. Provisional Patent Application Ser. No. 62/857,692 filed Jun. 5, 2019, the disclosure of which is hereby incorporated by reference in its entirety.

FIELD

The present disclosure relates generally to a vehicle axle assembly, and more particularly to a vehicle axle assembly including a wheel speed reduction assembly.

BACKGROUND

This section provides background information related to the present disclosure and is not necessarily prior art.

Conventional electric propulsion systems for motor vehicles include an electric motor driving one or more wheels coupled to an axle. The electric motor often includes a single-speed gear reduction. In some examples, the electric motor drives the wheels through a conventional axle and gear reduction assembly to produce an optimal level of torque and speed. In other examples, the electric motor and the gear reduction assembly are incorporated into the axle assembly, from which the electric motor drives the wheels through the gear reduction assembly to produce an optimal level of torque and speed. While known axle assemblies have proven suitable for their intended purposes, there remains a need for improvement in the pertinent art.

SUMMARY

This section provides a general summary of the disclosure, and is not a comprehensive disclosure of its full scope or all of its features.

One aspect of the disclosure provides a vehicle axle assembly including a frame, a motor, and a gear reduction subassembly. The frame has a central portion and a distal end spaced from the central portion. The motor has a stator and a rotor. The stator is secured to the frame near the central portion and the rotor is rotatably coupled to the stator. The gear reduction subassembly includes a hub, a first planetary gear set, a second planetary gear set, and a synchromesh gear. The hub is configured to be secured to a wheel. The first planetary gear set has a first gear ratio and is configured to rotate the hub. The second planetary gear set has a second gear ratio different than the first gear ratio and is configured to rotate the hub. The synchromesh gear is coupled to the rotor and is configured to selectively engage the first planetary gear set and the second planetary gear set.

Implementations of the disclosure may include one or more of the following optional features. In some implementations, the vehicle axle assembly includes a hydraulic channel in fluid communication with a cavity disposed between the synchromesh gear and one of the first planetary gear set or the second planetary gear set, the hydraulic channel configured to direct a hydraulic force into the cavity and upon the synchromesh gear. The vehicle axle assembly may include a first spring and a second spring. The first spring may be disposed on a first side of the synchromesh gear and the second spring may be disposed on a second side of the synchromesh gear opposite the first spring. The first and second springs may bias the synchromesh gear toward an unengaged position. The hydraulic force may cause the synchromesh gear to overcome the biasing of the first and second springs to selectively engage one of the first planetary gear set or the second planetary gear set.

The gear reduction subassembly may include a brake rotor rotationally aligned with the hub. The first planetary gear set and the second planetary gear set may be disposed further from the central portion of the frame than the brake rotor.

The first planetary gear set and the second planetary gear set may be disposed further from the central portion of the frame than the hub.

Another aspect of the disclosure provides an axle assembly for a vehicle includes a frame, a motor, and a pair of gear reduction subassemblies. The frame extends between a first distal end and a second distal end. The second distal end opposes the first distal end. The motor is secured to the frame between the first distal end and the second distal end. The pair of gear reduction subassemblies are rotatably coupled to the first distal end and the second distal end and configured to drive rotation from the motor to a pair of wheels. Each gear reduction subassembly includes a plurality of gears defining a plurality of gear ratios. This aspect may include one or more of the following optional features.

In some implementations, the plurality of gears includes a first planetary gear set having a first gear ratio and a second planetary gear set having a second gear ratio different than the first gear ratio.

Each gear reduction subassembly may include a hub configured to be secured to each of the wheels and a brake rotor rotationally aligned with the hub. The hub and the brake rotor may be disposed between the plurality of gears and the motor.

In some implementations, the plurality of gears includes a first planetary gear set having a first gear ratio, a second planetary gear set having a second gear ratio different than the first gear ratio, and a synchromesh gear coupled to the motor, the synchromesh gear configured to selectively engage the first planetary gear set and the second planetary gear set. The axle assembly may include a pair of hydraulic channels in fluid communication with cavities disposed between the synchromesh gear and the first planetary gear set and the second planetary gear set. The hydraulic channels may be configured to direct a hydraulic force into the cavities and upon the synchromesh gear. The gear reduction subassembly may include a pair of springs disposed on either side of the synchromesh gear. The pair of springs may bias the synchromesh gear toward an unengaged position. The hydraulic force may cause the synchromesh gear to overcome the biasing of the pair of springs to selectively engage one of the first planetary gear set or the second planetary gear set.

Another aspect of the disclosure provides a vehicle including a pair of wheels and an axle assembly including a frame, a motor, and a pair of gear reduction subassemblies. The frame extends between opposing distal ends. The motor is secured to the frame between the distal ends. The pair of gear reduction subassemblies are rotatably coupled to the frame and configured to drive rotation from the motor to the pair of wheels. Each gear reduction subassembly includes a plurality of gears defining a plurality of gear ratios. This aspect may include one or more of the following optional features.

In some implementations, the plurality of gears includes a first planetary gear set having a first gear ratio and a second planetary gear set having a second gear ratio different than the first gear ratio.

Each gear reduction subassembly may include a hub configured to be secured to each of the wheels and a brake rotor rotationally aligned with the hub. The hub and the brake rotor may be disposed between the plurality of gears and the motor.

In some implementations, the plurality of gears includes a first planetary gear set having a first gear ratio, a second planetary gear set having a second gear ratio different than the first gear ratio, and a synchromesh gear coupled to the motor, the synchromesh gear configured to selectively engage the first planetary gear set and the second planetary gear set. The axle assembly may include a pair of hydraulic channels in fluid communication with cavities disposed between the synchromesh gear and the first planetary gear set. The hydraulic channels may be configured to direct a hydraulic force into the cavities and upon the synchromesh gear. The gear reduction subassembly may include a pair of springs disposed on either side of the synchromesh gear. The pair of springs may bias the synchromesh gear toward an unengaged position. The hydraulic force may cause the synchromesh gear to overcome the biasing of the pair of springs to selectively engage one of the first planetary gear set or the second planetary gear set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
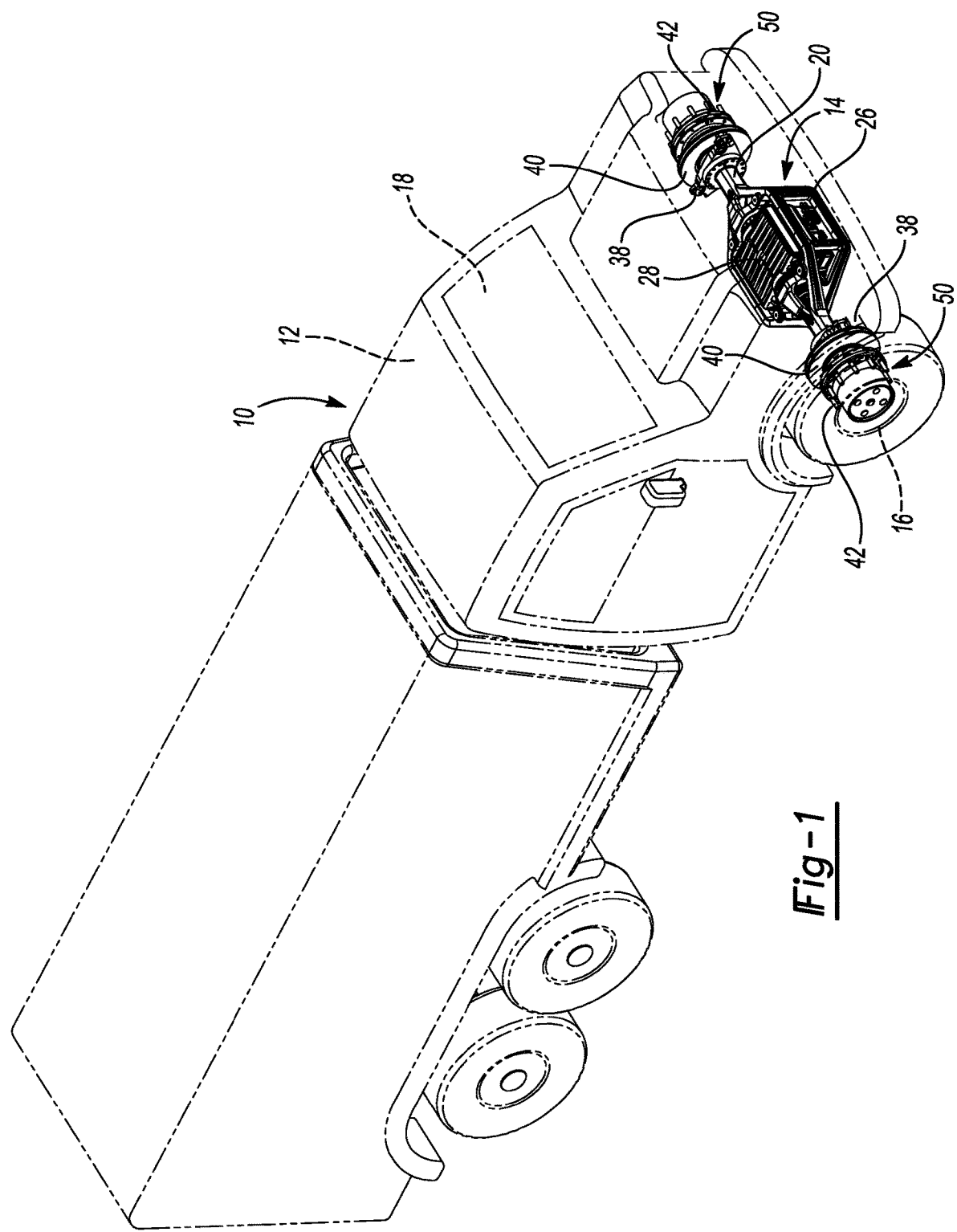
FIG. 1 is a perspective view of a vehicle including an axle assembly in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a vehicle 10 is illustrated and includes a body 12, an axle assembly 14, and a plurality of wheels 16. While the vehicle 10 is generally illustrated as being a commercial utility vehicle, it will be appreciated that the vehicle 10 may include other types of vehicles (e.g., passenger car, van, truck, etc.) within the scope of the present disclosure. In this regard, the body 12 may define a passenger compartment 18 for housing one or more occupants or users of the vehicle 10. As will be described in more detail below, the axle assembly 14 may be coupled to, and drive rotation of, the wheels 16 for moving the vehicle 10 in forward and rearward directions relative to the ground.

Figure 2:
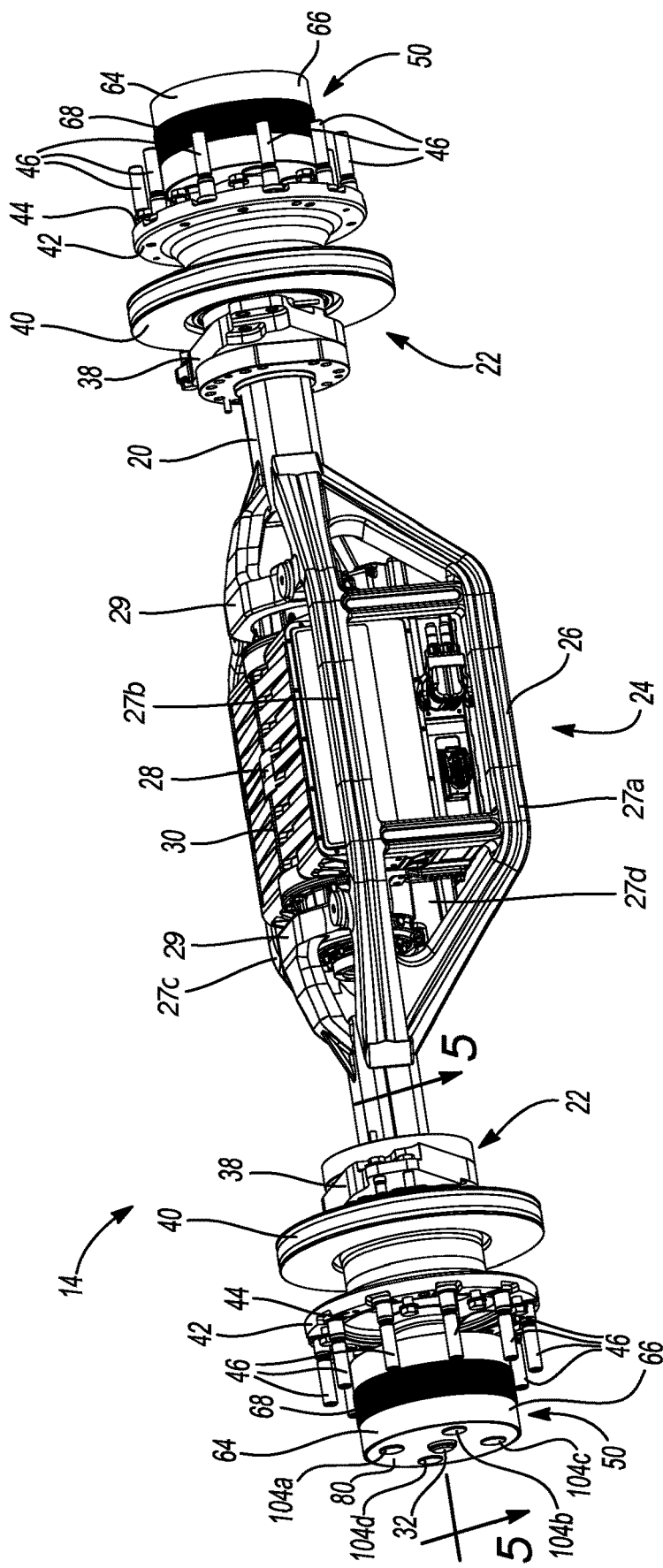
FIG. 2 is a perspective view of the axle assembly of FIG. 1.
Figure 3:
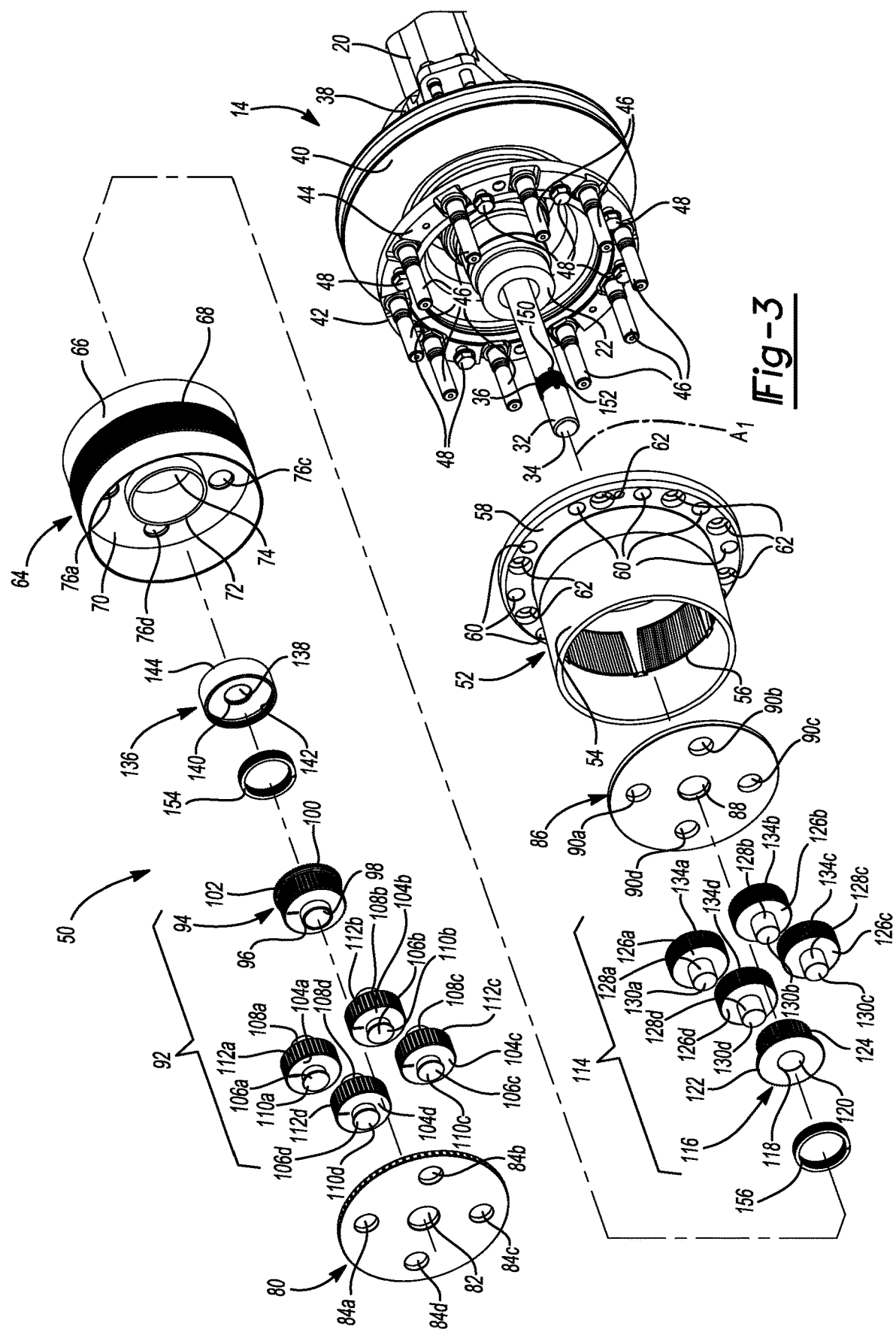
FIG. 3 is a partially exploded view of the axle assembly of FIG. 1.

As illustrated in FIG. 2, the axle assembly 14 may include a frame 20 extending between opposed distal ends 22 and a central portion 24 disposed between the distal ends 22. The axle assembly 14 may include a motor 28 secured to the frame 20 between the distal ends 22, (e.g., at or near the central portion 24). A pair of gear reduction subassemblies 50 may be rotatably coupled to the frame 20 and configured to drive rotation of the wheels 16 (e.g., a pair of wheels 16), via the motor 28. As illustrated in FIG. 3, each gear reduction subassembly 50 may include a plurality of gears including an outer planetary gear set 92 and an inner planetary gear set 114, defining a plurality of gear ratios.

Referring to FIGS. 1 and 2, the frame 20 includes the distal ends 22, the central portion 24 disposed between the distal ends 22, and a cradle 26 located at or near the central portion 24. When installed in the vehicle 10, the frame 20 may extend laterally across the vehicle 10 from one of the distal ends 22 at or near one of the wheels 16 to the other of the distal ends 22 at or near another of the wheels 16. For example, as shown in FIG. 1, the axle assembly 14 may be associated with front wheels 16 of the vehicle 10, such that the frame 20 extends between a front-right wheel 16 and a front-left wheel 16. In other implementations, the axle assembly 14 may be associated with rear wheels 16 of the vehicle 10 or with any other suitable wheels 16.

The central portion 24 of the frame 20 may include the cradle 26 configured to contain the motor 28. In some implementations, the cradle 26 may include four laterally-extending members 27, 27a-d having attachment means (e.g., welding, mechanical fasteners, etc.), for securing the motor 28 to the cradle 26. The laterally-extending members 27 may define an opening configured to receive the motor 28. For example, the opening may be accessible from a bottom, a top, and/or a side of the frame 20, and the motor 28 may be received in the bottom, the top, or the side of the frame 20. In some implementations, the attachment means includes a pair of brackets 29 configured to properly position and align the motor 28 with the wheels 16. The frame 20 may define sealed members extending from the central portion 24 to the distal ends 22 which are configured to receive a lubricating fluid. The frame 20 may be formed of any suitable material, including, but not limited to, steel, carbon steel, chrome-molybdenum steel, aluminum, etc.

As illustrated in FIGS. 2 and 3, the motor 28 may include a stator 30 and a rotor 32. As set forth above, the motor 28 (i.e., the stator 30) may be mounted to the frame 20 at the cradle 26. In other implementations, the motor 28 may be mounted to a location on the vehicle 10 other than the frame 20 such as, for example, the body 12. The rotor 32 may be rotatably coupled to the stator 30 and may extend from the central portion 24 past each of the distal ends 22. The rotor 32 may extend along and rotate about an axis $A_1$ (FIG. 3). In some implementations, a single motor 28 may be provided having a single stator 30 and a single rotor 32 extending past the distal ends 22. In other implementations, a single motor 28 may be provided having a single stator 30 and two rotors 32 each extending past one of the distal ends 22. In yet another implementation, two motors 28 may be provided, each having a single stator 30 and a single rotor 32 extending past one of the distal ends 22. In some implementations, the motor 28 may be an electric axle ("e-axle") including at least one gearbox.

Figure 4:
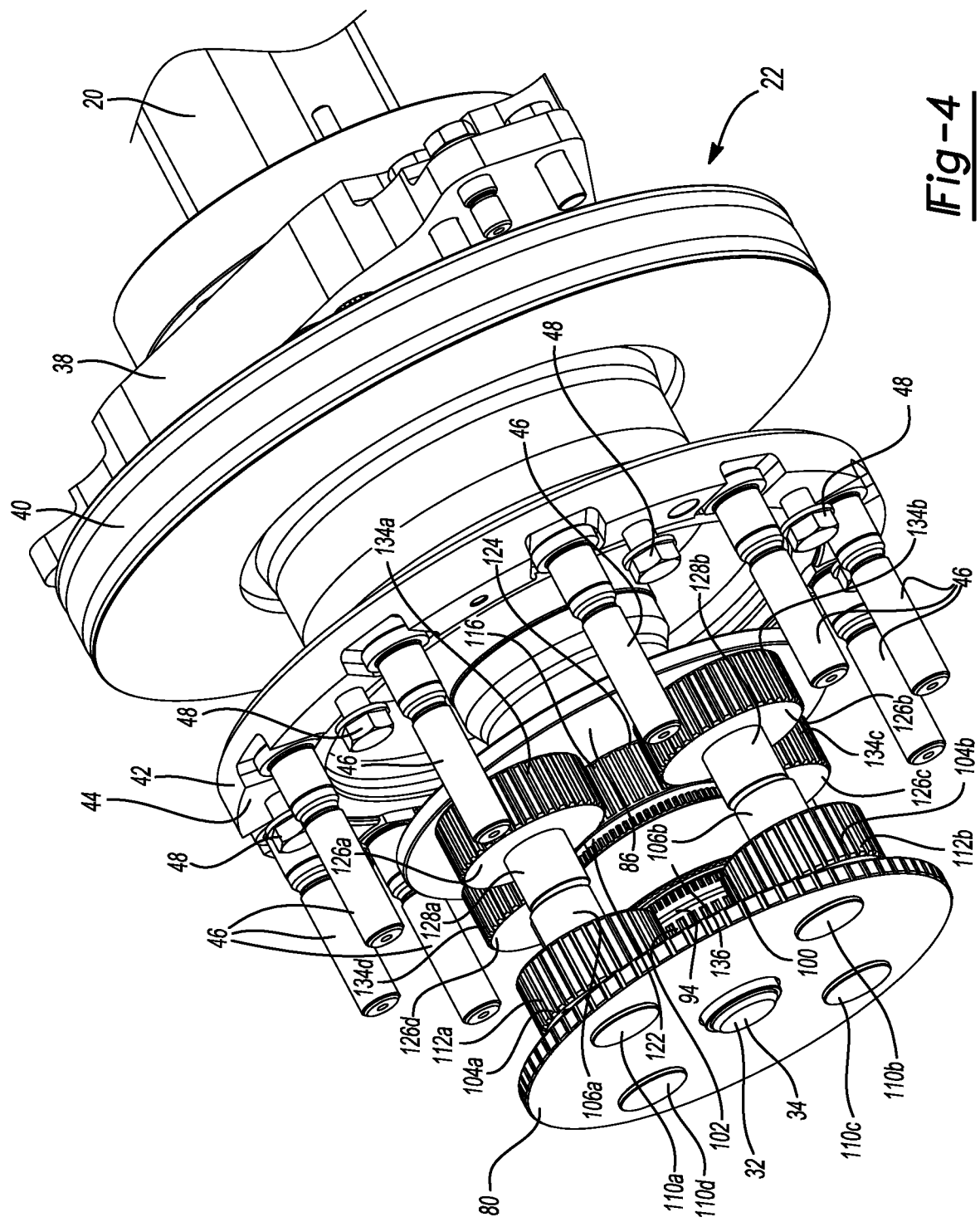
FIG. 4 is another perspective view of the axle assembly of FIG. 1, with certain components hidden for clarity.
Figure 5A:
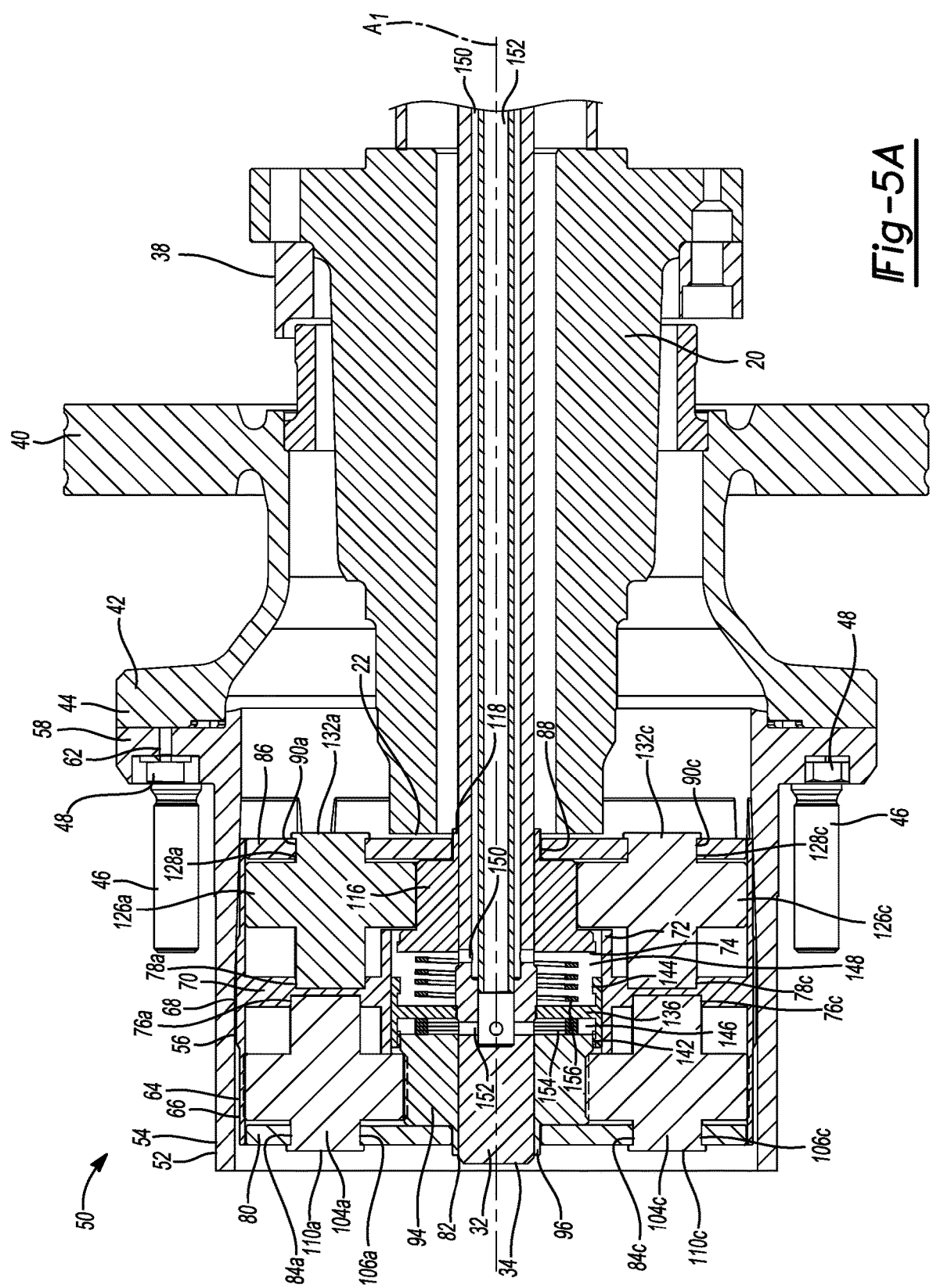
FIG. 5A is a cross-sectional view of a gear reduction assembly of the axle assembly of FIG. 1 taken along the line 5-5 of FIG. 2, the gear reduction assembly shown in a first mode of operation.
Figure 5B:
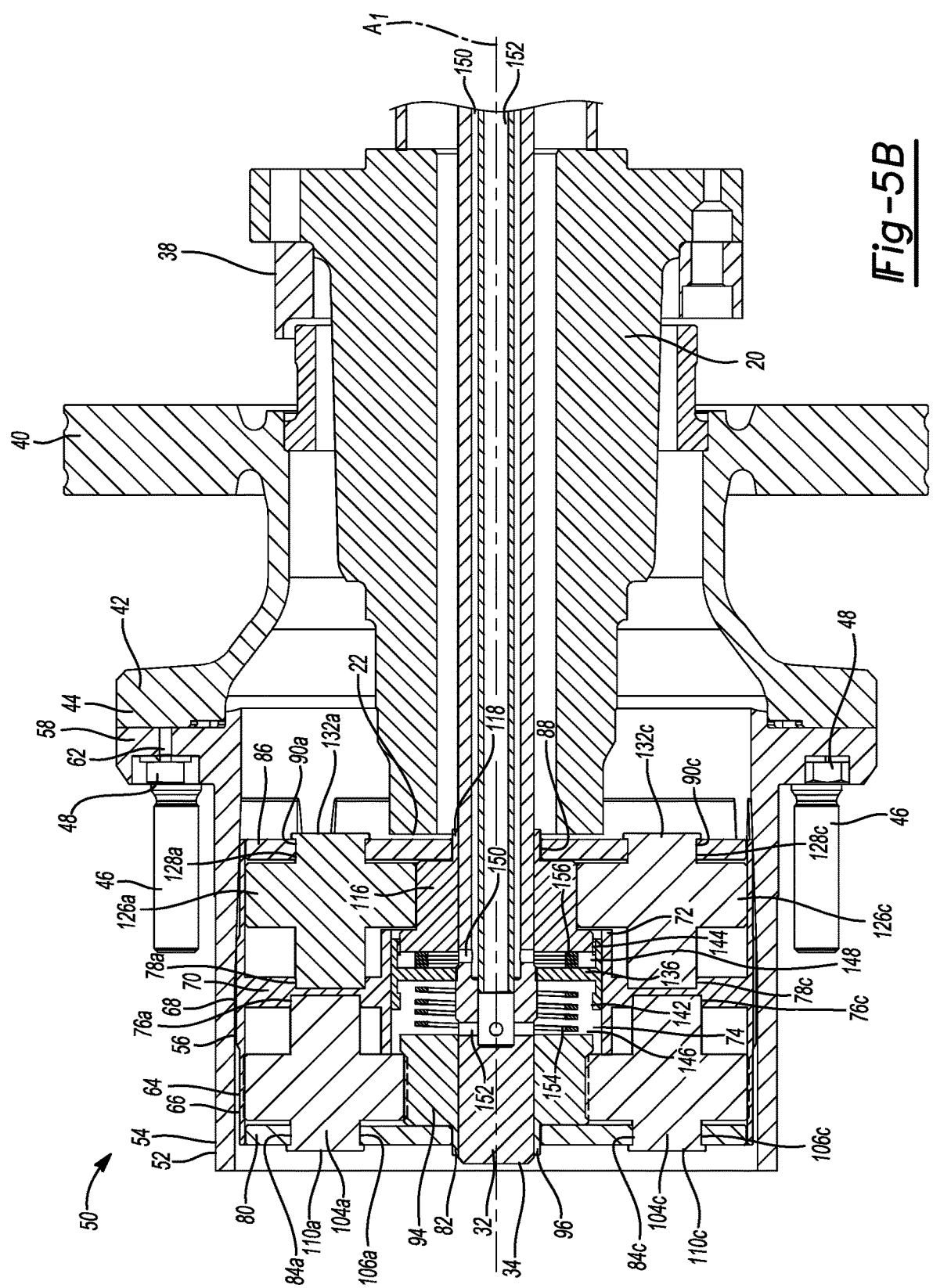
FIG. 5B is a cross-sectional view of the gear reduction assembly of the axle assembly of FIG. 1 taken along the line 5-5 of FIG. 2, the gear reduction assembly shown in a second mode of operation.

The rotor 32 may include distal ends 34 located on opposite sides of the stator 30. For example, as shown in FIGS. 4-5B, the distal ends 34 may extend through a central aperture 82 of an outer carrier 80 when the gear reduction subassembly 50 is assembled (as shown in FIGS. 1, 5A, and 5B). Referring to FIG. 3, the stator 30 may include rotor teeth 36 disposed on an outer surface of the stator 30. As set forth below, the rotor teeth 36 may be configured to meshingly engage central teeth 140 of a synchromesh gear 136.

In some implementations, the motor 28 may be an electric motor, such as, for example, a brushless AC motor, a brushed DC motor, a brushless DC motor, or an AC induction motor. Further, the motor 28 may be connected to a battery (not shown), such as, for example, a lead-acid battery, a nickel metal hydride battery, a sodium battery, a lithium-ion battery. In other implementations, the motor 28 may be any suitable motor, including, but not limited to, an internal combustion engine.

Referring to FIG. 2, the axle assembly 14 may include a brake caliper mount 38, a brake rotor 40, and a hub 42. In some implementations, the axle assembly 14 may include a pair of brake caliper mounts 38, a pair of brake rotors 40, and a pair of hubs 42, with each one of the pairs being substantially similar to the other one of the pairs. The brake caliper mount 38 may be configured to receive a brake caliper (not shown) that is engageable with the brake rotor 40 to provide a braking force for the vehicle 10. The brake caliper mount 38 may be secured to the frame 20 and the brake rotor 40 may be secured to the hub 42. The hub 42 may be rotatably coupled to the frame 20 about the axis $A_1$ and may include a first flange 44 extending around the frame 20. The first flange 44 may include a plurality of wheel bolts 46 and a plurality of outer casing bolts 48. The wheel bolts 46 may secure a wheel 16 to the axle assembly 14, such that, when the wheel 16 is secured to the axle assembly 14, the hub 42 may be rotationally aligned with the wheel 16. That is, as the wheel rotates 16, the hub 42 similarly rotates and vice versa. As set forth below, the outer casing bolts 48 may secure an outer casing 52 to the hub 42.

Referring to FIGS. 3-5B, the axle assembly 14 may include the pair of gear reduction subassemblies 50, which may be substantially the same as each other. Accordingly, only one of the pair of gear reduction subassemblies 50 (e.g., a right gear reduction subassembly 50) is described below. The gear reduction assembly 50 may include the outer casing 52, a carrier housing 64, the outer carrier 80, an inner carrier 86, an outer planetary gear set 92, an inner planetary gear set 114, the synchromesh gear 136, an outer spring 154, and an inner spring 156. In some implementations, the gear reduction subassembly 50 includes the brake rotor 40 and the hub 42. The components of the gear reduction subassembly 50 may be formed of the same materials, different materials, or a combination of materials. For example, the components of the gear reduction subassembly 50 may be formed of steel, aluminum, brass, copper, iron, carbon fiber, plastic, etc.

The outer casing 52 may include a main body 54 and a second flange 58. The main body 54 of the outer casing 52 may be generally cylindrical and the second flange 58 may extend radially from an end of the main body 54. The main body 54 may include outer casing teeth 56 located on an interior surface of the main body 54. As set forth below, the outer casing teeth 56 may be configured to meshingly engage carrier housing teeth 68 of the carrier housing 64. The second flange 58 may include wheel bolt apertures 60 and outer casing bolt apertures 62. The wheel bolt apertures 60 may be configured to receive the wheel bolts 46 and the outer casing bolt apertures 62 may be configured to receive the outer casing bolts 48. That is, the second flange 58 of the outer casing 52 may be secured to the first flange 44 of the hub 42 via the casing bolt apertures 62, and the outer casing 52 may be rotationally aligned with the hub 42. Additionally, the outer casing 52 may be rotationally aligned with the hub 42 about the axis $A_1$ by the wheel bolts 46 engaging with the wheel bolt apertures 60. In other implementations, the outer casing 52 may be secured to the hub 42 in any suitable manner, such as, welding, gluing, etc.

Referring to FIGS. 2 and 3, the carrier housing 64 may include an outer ring 66 and an inner wall 70. The outer ring 66 may include the carrier housing teeth 68 disposed on an outer surface of the outer ring 66. The carrier housing teeth 68 may be configured to meshingly engage with the outer casing teeth 56 such that, as the carrier housing 64 rotates, the outer casing 52 similarly rotates and vice versa. The inner wall 70 of the carrier housing 64 may include a central stem 72, outer depressions 76, 76a-d, and inner depressions 78, 78a-d (FIG. 5A). The central stem 72 may extend from opposite surfaces of the inner wall 70 and may define a central aperture 74 extending through the carrier housing 64. As will become apparent, the central aperture 74 may be configured to receive the rotor 32 of the motor 28, an outer sun gear 94, an inner sun gear 116, the synchromesh gear 136, the outer spring 154, and the inner spring 156.

The outer carrier 80 may include the central aperture 82 and a plurality of radial apertures 84, 84a-d. The outer carrier 80 may have a generally circular cross-section with a radius equal to, or slightly less than, a radius of the outer ring 66 of the carrier housing 64. The central aperture 82 of the outer carrier 80 may be configured to receive the rotor 32. Similarly, the inner carrier 86 may include a central aperture 88 and a plurality of radial apertures 90, 90a-d. The inner carrier 86 may have a generally circular cross-section with a radius equal to, or slightly less than, a radius of the outer ring 66 of the carrier housing 64. The central aperture 88 of the inner carrier 86 may be configured to receive the rotor 32. The outer carrier 80 and the inner carrier 86 may be secured to the carrier housing 64 in any suitable manner, such as, for example, mechanical engagements, mechanical fasteners, welding, glue, etc.

Referring to FIGS. 3-5B, the outer planetary gear set 92 may include the outer sun gear 94 rotatably coupled to the rotor 32 and a plurality of outer planetary gears 104, 104a-d. The outer sun gear 94 may be rotatable about the axis $A_1$. The outer sun gear 94 may include a central stem 96 extending from a distal surface of the outer sun gear 94 and the central stem 96 may define a central aperture 98 extending through the outer sun gear 94. The central aperture 98 may be configured to receive the rotor 32, and the central stem 96 may be configured to engage and rotate relative to the central aperture 82 of the outer carrier 80. That is, an inner radius of the central aperture 82 of the outer carrier 80 may be slightly larger than an outer radius of the central stem 96 such that the central stem 96 may be supported by the central aperture 82 of the outer carrier 80, but still rotate relative to the outer carrier 80.

The outer sun gear 94 may include first outer sun teeth 100 and second outer sun teeth 102. The first outer sun teeth 100 may be disposed closer to the central portion 24 of the frame 20 than the second outer sun teeth 102 when the gear reduction subassembly 50 is assembled. The first outer sun teeth 100 may be disposed on a radial surface of the outer sun gear 94 that has a larger radius than a radial surface of the outer sun gear 94 on which the second outer sun teeth 102 are disposed.

The plurality of outer planetary gears 104, 104a-d may each include a stem 106, 106a-d and outer planet teeth 112, 112a-d. Each stem 106 may extend from a proximal end 108, 108a-d to a distal end 110, 110a-d. In other implementations, there may be two separate stems 106 disposed on opposite sides of each of the outer planetary gears 104. Each proximal end 108 may be configured to engage the outer depressions 76 of the carrier housing 64, such that each stem 106 may be supported by one of the outer depressions 76, but may still rotate relative to the inner wall 70 of the carrier housing 64. The outer planet teeth 112 may be configured to meshingly engage the second outer sun teeth 102. The outer planetary gear set 92 may define a first gear ratio.

The inner planetary gear set 114 may include the inner sun gear 116 rotatably coupled to the rotor 32 and a plurality of inner planetary gears 126, 126a-d. The inner sun gear 116 may be rotatable about the axis $A_1$. The inner sun gear 116 may include a central stem 118 extending from a distal surface of the inner sun gear 116 and the central stem 118 may define a central aperture 120 extending through the inner sun gear 116. The central aperture 120 may be configured to receive the rotor 32 and the central stem 118 may be configured to engage and rotate relative to the central aperture 82 of the outer carrier 80. That is, an inner radius of the central aperture 82 of the outer carrier 80 may be slightly larger than an outer radius of the central stem 118 such that the central stem 118 may be supported by the central aperture 82 of the outer carrier 80, but may still rotate relative to the outer carrier 80.

The inner sun gear 116 may include first inner sun teeth 122 and second inner sun teeth 124. The second inner sun teeth 124 may be disposed closer to the central portion 24 of the frame 20 than the first inner sun teeth 122 when the gear reduction subassembly 50 is assembled. The first inner sun teeth 122 may be disposed on a radial surface of the inner sun gear 116 that has a larger radius than a radial surface of the inner sun gear 116 on which the second inner sun teeth 124 are disposed.

The plurality of inner planetary gears 126, 126a-d may each include a stem 128, 128a-d and inner planet teeth 134, 134a-d. Each stem 128 may extend from a proximal end 130, 130a-d to a distal end 132, 132a-d. In other implementations, there may be two separate stems 128 disposed on opposite sides of each of the inner planetary gears 126. Each proximal end 130 may be configured to engage the inner depressions 78 of the carrier housing 64, such that each stem 128 may be supported by one of the inner depressions 78, but may still rotate relative to the inner wall 70 of the carrier housing 64. The inner planet teeth 134 may be configured to meshingly engage the second inner sun teeth 124. The inner planetary gear set 114 may define a second gear ratio. The second gear ratio may be different than the first gear ratio. For example, the second gear ratio may be greater than or less than the first gear ratio.

The gear reduction subassembly 50, including the outer planetary gear set 92 and the inner planetary gear set 114, may be disposed further from the central portion 24 of the frame 20 than the brake rotor 40 and the hub 42. For example, the gear reduction subassembly 50 may be disposed further from the stator 30 of the motor 28 than the brake rotor 40 and the hub 42. For example, the hub 42 and the brake rotor 40 may be disposed between the gear reduction subassembly 50 and the stator 30 of the motor 28. In some implementations, the gear reduction subassembly 50 may be disposed substantially within wheel wells of the vehicle 10. That is, the gear reduction subassembly 50 may be substantially surrounded by tires of the wheels 16. In other implementations, the gear reduction subassembly 50 may be disposed between the stator 30 of the motor 28 and the hub 42. In such implementations, the gear reduction subassembly 50 may be fixed to the frame 20 and the hub 42 may drive rotation of the wheels 16.

With continued reference to FIGS. 3-5B, the synchromesh gear 136 may be disposed between the outer sun gear 94 and the inner sun gear 116 when the gear reduction subassembly 50 is assembled. The synchromesh gear 136 and the outer sun gear 94 may define an outer cavity 146. The synchromesh gear 136 and the inner sun gear 116 may define an inner cavity 148. The synchromesh gear 136 may include a central aperture 138 extending through the synchromesh gear 136, the central aperture 138 configured to receive the rotor 32 of the motor 28. Disposed around an interior surface that defines the central aperture 138 is the central teeth 140 that are configured to meshingly engage the rotor teeth 36 of the rotor 32, such that the rotor 32 may drive rotation of the synchromesh gear 136. That is, the synchromesh gear 136 may be coupled to and rotationally aligned with the rotor 32. The synchromesh gear 136 may be coupled to the rotor 32 such that the synchromesh gear 136 is slidable along the axis $A_1$ and the rotor 32 drives rotation of the synchromesh gear 136 about the axis $A_1$. In other implementations, the synchromesh gear 136 may be rotationally aligned with the rotor 32 in any suitable manner, such as, for example, welding, mechanical fasteners, etc.

The synchromesh gear 136 may include a distal inner circumferential surface having outer synchromesh teeth 142 and a proximal inner circumferential surface having inner synchromesh teeth 144 opposite the outer synchromesh teeth 142. For example, when the gear reduction subassembly 50 is assembled, the outer synchromesh teeth 142 may be disposed further from the central portion 24 of the frame 20 than the inner synchromesh teeth 144. The synchromesh gear 136 is configured to selectively engage the outer planetary gear set 92 and the inner planetary gear set 114. For example, the outer synchromesh teeth 142 may be configured to meshingly engage the first outer sun teeth 100 of the outer sun gear 92, and the inner synchromesh teeth 144 may be configured to meshingly engage the first inner sun teeth 122 of the inner sun gear 116. The synchromesh gear 136 may be movable (e.g., translatable relative to the axis $A_1$) between an unengaged position (FIG. 4), an outer position (FIG. 5A), and an inner position (FIG. 5B). In the unengaged position, the synchromesh gear 136 may be located between and spaced from the outer sun gear 92 and the inner sun gear 116. In the outer position, the outer synchromesh teeth 142 of the synchromesh gear 136 may be meshingly-engaged with the first outer sun teeth 100 of the outer sun gear 94 and the synchromesh gear 136 may be spaced from the inner sun gear 116. In the inner position, the inner synchromesh teeth 144 of the synchromesh gear 136 may be meshingly-engaged with the first inner sun teeth 122 of the inner sun gear 116 and the synchromesh gear 136 may be spaced from the outer sun gear 92. In some implementations, the synchromesh gear 136 may be a dog clutch or any other suitable type of gear.

Referring to FIGS. 5A and 5B, the outer spring 154 may be disposed in the outer cavity 146 on a first side of the synchromesh gear 136 and the inner spring 156 may be disposed in the inner cavity 148 on a second side of the synchromesh gear 136 opposite the first side. For example, the inner spring 156 may be disposed closer to the central portion 24 of the frame 20 than the outer spring 154 when the gear reduction subassembly 50 is assembled. The outer spring 154 and the inner spring 156 may each abut the synchromesh gear 136 and may each bias the synchromesh gear 136 to the unengaged position. For example, the outer spring 154 may extend from the outer sun gear 94 to the synchromesh gear 136, exerting opposing forces on the outer sun gear 94 and the synchromesh gear 136, and the inner spring 156 may extend from the inner sun gear 116 to the synchromesh gear 136, exerting opposing forces on the inner sun gear 116 and the synchromesh gear 136. The outer spring 154 and the inner spring 156 may be substantially similar to each other, or the outer spring 154 and the inner spring 156 may be different from each other. The outer spring 154 and the inner spring 156 may each be any suitable type of spring, such as, for example, a helical spring, a conical spring, a Belleville spring, etc.

With continued reference to FIGS. 5A and 5B, the rotor 32 includes a first hydraulic channel 150 and a second hydraulic channel 152. The first hydraulic channel 150 may surround and be spaced from the second hydraulic channel 152, and the first hydraulic channel 150 may extend through the rotor 32 into the outer cavity 146 (e.g., into the central aperture 74 of the carrier housing 64 between the inner sun gear 116 and the synchromesh gear 136). The second hydraulic channel 152 may extend through a center of the rotor 32 into the inner cavity 148 (e.g., into the central aperture 74 of the carrier housing 64 between the outer sun gear 94 and the synchromesh gear 136). The first hydraulic channel 150 and the second hydraulic channel 152 may each be configured to direct a hydraulic force into the outer cavity 146 and the inner cavity 148, respectively, and upon the synchromesh gear 136. Each hydraulic force may be sourced from a hydraulic system (not shown) that may be secured to a portion of the axle assembly 14 or any suitable location on the vehicle 10. The hydraulic force directed by the first hydraulic channel 150 may cause the synchromesh gear 136 to overcome the biasing of the outer spring 154 to move to the outer position where the outer synchromesh teeth 142 of the synchromesh gear 136 are meshingly-engaged with the first outer sun teeth 100 of the outer sun gear 94. The hydraulic force directed by the second hydraulic channel 152 may cause the synchromesh gear 136 to overcome the biasing of the inner spring 156 to move to the inner position where the inner synchromesh teeth 144 of the synchromesh gear 136 are meshingly-engaged with the first inner sun teeth 122 of the inner sun gear 116.

As one example of operation, the motor 28 drives rotation of the rotor 32 about the axis $A_1$ which drives rotation of the synchromesh gear 136 about the axis $A_1$. If the synchromesh gear 136 is in the unengaged position, then the synchromesh gear 136 rotates without contacting the outer sun gear 94 or the inner sun gear 116. If a hydraulic force sufficient enough to overcome the biasing of the outer spring 154 is directed through the first hydraulic channel 150, then the synchromesh gear 136 is moved to the outer position where the outer synchromesh teeth 142 of the synchromesh gear 136 are meshingly-engaged with the first outer sun teeth 100 of the outer sun gear 94. Upon the rotor 32 rotating, the synchromesh gear 136 in the outer position rotates and drives rotation of the outer sun gear 94 about the axis $A_1$ by the engagement of the outer synchromesth teeth 142 and the first outer sun teeth 100. The outer sun gear 94 drives rotation of the outer planetary gears 104 about axes extending through the center of each stem 106 and around the axis $A_1$ by the engagement of the second outer sun teeth 102 and the outer planet teeth 112. As the outer planetary gears 104 rotate around the axis $A_1$, the outer planetary gears 104 drive rotation of the outer carrier 80 about the axis $A_1$ by the stems 106 engaging the radial apertures 84. By being secured to the carrier housing 64, the outer carrier 80 drives rotation of the carrier housing 64, which, in turn, drives rotation of the outer casing about the axis $A_1$ by the engagement of the carrier housing teeth 68 and the outer casing teeth 56. By being secured to the hub 42 via the wheel bolts 46 and the outer casing bolts 48, the outer casing 52 drives rotation of the hub 42 about the axis $A_1$. By being secured to the wheels 16 via the wheel bolts 46, the hub 42 drives rotation of the wheels 16 about the axis $A_1$, which causes the vehicle 10 to move in either forward or rearward directions relative to the ground.

As another example of operation, the motor 28 drives rotation of the rotor 32 about the axis $A_1$ which drives rotation of the synchromesh gear 136 about the axis $A_1$. If the synchromesh gear 136 is in the unengaged position, then the synchromesh gear 136 rotates without contacting the outer sun gear 94 or the inner sun gear 116. If a hydraulic force sufficient enough to overcome the biasing of the inner spring 156 is directed through the second hydraulic channel 152, then the synchromesh gear 136 is moved to the inner position where the inner synchromesh teeth 144 of the synchromesh gear 136 are meshingly-engaged with the first inner sun teeth 122 of the inner sun gear 116. Upon the rotor 32 rotating, the synchromesh gear 136 in the inner position rotates and drives rotation of the inner sun gear 116 about the axis $A_1$ by the engagement of the inner synchromesth teeth 144 and the first inner sun teeth 122. The inner sun gear 116 drives rotation of the inner planetary gears 126 about axes extending through the center of each stem 128 and around the axis $A_1$ by the engagement of the second inner sun teeth 124 and the inner planet teeth 134. As the inner planetary gears 126 rotate around the axis $A_1$, the inner planetary gears 126 drive rotation of the inner carrier 86 about the axis $A_1$ by the stems 128 engaging the radial apertures 90. By being secured to the carrier housing 64, the inner carrier 86 drives rotation of the carrier housing 64, which, in turn, drives rotation of the outer casing about the axis $A_1$ by the engagement of the carrier housing teeth 68 and the outer casing teeth 56. By being secured to the hub 42 via the wheel bolts 46 and the outer casing bolts 48, the outer casing 52 drives rotation of the hub 42 about the axis $A_1$. By being secured to the wheels 16 via the wheel bolts 46, the hub 42 drives rotation of the wheels 16 about the axis $A_1$, which causes the vehicle 10 to move in either forward or rearward directions relative to the ground.

As set forth above, the synchromesh gear 136 may selectively engage one of the outer planetary gear set 92 and the inner planetary gear set 114 by a hydraulic force being directed either through the first hydraulic channel 150 or the second hydraulic channel 152, respectively. The selective engagement of the synchromesh gear 136 determines whether the wheels 16 are driven via the first gear ratio or the second gear ratio. The gear ratio determines the speed at which the wheels 16 rotate relative to the speed at which the rotor 32 rotates. The first gear ratio may be determined by the number of teeth in each of (i) the outer synchromesh teeth 142, (ii) the first outer sun teeth 100, (iii) the second outer sun teeth 102, (iv) the outer planet teeth 112, (v) the carrier housing teeth 68, and/or (vi) the outer casing teeth 56. The second gear ratio may be determined by the number of teeth in each of (i) the inner synchromesh teeth 144, (ii) the first inner sun teeth 122, (iii) the second inner sun teeth 124, (iv) the inner planet teeth 134, (v) the carrier housing teeth 68, and/or (vi) the outer casing teeth 56.

In some implementations, the axle assembly 14 may incorporate the motor 28 which may be an e-axle including at least one gearbox. The axle assembly 14 may be configured for vehicles having independent rear suspension. For example, the axle assembly 14 may utilize a high volume e-axle traditionally incorporated into passenger vehicles (e.g., light duty trucks) and the gear reduction subassembly 50 may operate to match the torque and/or speed requirements of a commercial vehicle application (e.g., cargo vans). By using the outer planetary gear set 92 having the first gear ratio and the inner planetary gear set 114 having the second gear ratio, the axle assembly 14 may have the ability to adapt to different e-axles. For example, the axle assembly 14 may convert torque and/or speed inputs from an e-axle to suitable torque/speed outputs for the desired vehicle application.

Other benefits may include, but are not limited to: lower cost for an electric propulsion system due to leveraging high volume applications for major components (e.g., e-motor, inverter, gear reduction, etc.); axle assembly can be configured to allow for conventional frame spacing and attachment with minimal modifications and minimal space requirements; and axle assembly can be tailored to specific vehicle application for toque/speed allowing broad range of usage of a high volume e-axle.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An axle assembly for a vehicle, the axle assembly comprising:
    a frame extending between a first distal end and a second distal end, the second distal end opposing the first distal end;
    a motor secured to the frame between the first distal end and the second distal end; and
    a pair of gear reduction subassemblies rotatably coupled to the first distal end and the second distal end and configured to drive rotation from the motor to a pair of wheels, each gear reduction subassembly including a plurality of gears defining a plurality of gear ratios;
    wherein each gear reduction subassembly includes a hub configured to be secured to each of the wheels and a brake rotor rotationally aligned with the hub, the hub and the brake rotor being disposed between the plurality of gears and the motor.

2. The axle assembly of claim 1, wherein the plurality of gears includes a first planetary gear set having a first gear ratio and a second planetary gear set having a second gear ratio different than the first gear ratio.

3. The axle assembly of claim 1, wherein the plurality of gears includes a first planetary gear set having a first gear ratio, a second planetary gear set having a second gear ratio different than the first gear ratio, and a synchromesh gear coupled to the motor, the synchromesh gear configured to selectively engage the first planetary gear set and the second planetary gear set.

4. The axle assembly of claim 3, further comprising a pair of hydraulic channels in fluid communication with cavities disposed between the synchromesh gear and the first planetary gear set and the second planetary gear set, the hydraulic channels configured to direct a hydraulic force into the cavities and upon the synchromesh gear.

5. The axle assembly of claim 4, wherein the gear reduction subassembly includes a pair of springs disposed on either side of the synchromesh gear, the pair of springs biasing the synchromesh gear toward an unengaged position.

6. The axle assembly of claim 5, wherein the hydraulic force causes the synchromesh gear to overcome the biasing of the pair of springs to selectively engage one of the first planetary gear set or the second planetary gear set.

7. A vehicle comprising:
a pair of wheels; and
an axle assembly including:
- a frame extending between opposing distal ends;
- a motor secured to the frame between the distal ends; and
- a pair of gear reduction subassemblies rotatably coupled to the frame and configured to drive rotation from the motor to the pair of wheels, each gear reduction subassembly including a plurality of gears defining a plurality of gear ratios;
- wherein each gear reduction subassembly includes a hub configured to be secured to each of the wheels and a brake rotor rotationally aligned with the hub, and wherein the hub and the brake rotor are disposed between the plurality of gears and the motor.

8. The vehicle of claim 7, wherein the plurality of gears includes a first planetary gear set having a first gear ratio and a second planetary gear set having a second gear ratio different than the first gear ratio.

9. The vehicle of claim 7, wherein the plurality of gears includes a first planetary gear set having a first gear ratio, a second planetary gear set having a second gear ratio different than the first gear ratio, and a synchromesh gear coupled to the motor, the synchromesh gear configured to selectively engage the first planetary gear set and the second planetary gear set.

10. The vehicle of claim 9, wherein the axle assembly includes a pair of hydraulic channels in fluid communication with cavities disposed between the synchromesh gear and the first planetary gear set and the second planetary gear set, the hydraulic channels configured to direct a hydraulic force into the cavities and upon the synchromesh gear.

11. The vehicle of claim 10, wherein the gear reduction subassembly includes a pair of springs disposed on either side of the synchromesh gear, the pair of springs biasing the synchromesh gear toward an unengaged position.

12. The vehicle of claim 11, wherein the hydraulic force causes the synchromesh gear to overcome the biasing of the pair of springs to selectively engage one of the first planetary gear set or the second planetary gear set.

* * * * *